United States Patent
Schlytter-Henrichsen

(10) Patent No.: US 10,571,067 B2
(45) Date of Patent: Feb. 25, 2020

(54) FIRE PROTECTION FOR PIPES

(71) Applicant: Favuseal AS, Rud (NO)

(72) Inventor: Christian Schlytter-Henrichsen, Nesbru (NO)

(73) Assignee: Favuseal AS, Rud (NO)

( * ) Notice: Subject to any disclaimer, the term of this patent is extended or adjusted under 35 U.S.C. 154(b) by 59 days.

(21) Appl. No.: 15/772,298

(22) PCT Filed: Oct. 31, 2016

(86) PCT No.: PCT/EP2016/076246
§ 371 (c)(1),
(2) Date: Apr. 30, 2018

(87) PCT Pub. No.: WO2017/072362
PCT Pub. Date: May 4, 2017

(65) Prior Publication Data
US 2018/0320810 A1    Nov. 8, 2018

(30) Foreign Application Priority Data

Oct. 29, 2015   (EP) ..................................... 15192166

(51) Int. Cl.
*F16L 59/14*      (2006.01)
*A62C 2/06*       (2006.01)
(Continued)

(52) U.S. Cl.
CPC ............ *F16L 59/145* (2013.01); *A62C 2/065* (2013.01); *F16L 55/07* (2013.01); *F16L 57/04* (2013.01); *F16L 59/143* (2013.01)

(58) Field of Classification Search
CPC ......... F16L 59/145; F16L 55/07; F16L 57/04; F16L 59/143; A62C 2/065
(Continued)

(56) References Cited

U.S. PATENT DOCUMENTS 4,513,173 A *   4/1985   Merry .................. G02B 6/4436
                                                138/103
4,942,903 A     7/1990   Jacobsen
(Continued)

FOREIGN PATENT DOCUMENTS

| EP | 2 865 933 A1 | 4/2015 |
|---|---|---|
| WO | WO 2007/061311 A1 | 5/2007 |
| WO | WO 2012/101117 A2 | 8/2012 |

OTHER PUBLICATIONS

International Search Report for PCT/EP2016/076246 dated Jan. 26, 2017.

*Primary Examiner* — Craig M Schneider
*Assistant Examiner* — David R Deal
(74) *Attorney, Agent, or Firm* — Knobbe Martens Olson & Bear LLP

(57) ABSTRACT

A fire protection product for use as fire protection of a pipe (10), comprising an active layer (11) of a material containing an active substance which, when subjected to heat, expands and undergoes one or more endothermic reaction processes, the active layer (11) enclosing the pipe (10) on at least a length of the pipe to be protected; a plurality of distance pieces (12) extending a distance outwardly from the active layer (11); and an outer tubular cladding (13) supported by the distance pieces (12) and enclosing the pipe (10), the active layer (11) and the distance pieces (12). The active layer (11), the distance pieces (12) and the outer tubular cladding (13) define a space (15) with a volume, which can accommodate the active substance (11) after the active substance (11) has expanded. The active substance can be rubber based or polymer based.

14 Claims, 1 Drawing Sheet

(51) Int. Cl.
*F16L 57/04* (2006.01)
*F16L 55/07* (2006.01)

(58) Field of Classification Search
USPC ........ 138/149, 103, 111, 113, 114, 137, 140, 138/145, 148, 177
See application file for complete search history.

(56) References Cited

U.S. PATENT DOCUMENTS

| | | | | |
|---|---|---|---|---|
| 5,634,304 | A * | 6/1997 | Sakno | F16L 5/04 138/119 |
| 5,985,385 | A * | 11/1999 | Gottfried | B32B 1/08 405/157 |
| 6,477,813 | B2 * | 11/2002 | Andresen | F16L 5/04 137/360 |
| 6,718,100 | B2 * | 4/2004 | Morris | F16L 9/19 138/111 |
| 6,862,852 | B1 * | 3/2005 | Beele | A62C 2/065 137/67 |
| 2002/0185188 | A1 * | 12/2002 | Quigley | B32B 1/08 138/137 |
| 2003/0178220 | A1 * | 9/2003 | Barusseau | C08K 9/02 174/110 PM |
| 2010/0266790 | A1 * | 10/2010 | Kusinski | B32B 1/08 428/34.6 |

* cited by examiner

FIRE PROTECTION FOR PIPES

CROSS REFERENCE TO RELATED APPLICATIONS

This application is a U.S. National Phase Application of PCT International Application Number PCT/EP2016/076246, filed on Oct. 31, 2016, designating the United States of America and published in the English language, which is an International Application of and claims the benefit of priority to European Patent Application No. 15192166.5, filed on Oct. 29, 2015. The disclosures of the above-referenced applications are hereby expressly incorporated by reference in their entireties.

FIELD OF THE INVENTION

The invention relates to passive fire protection of tubular objects, such as pipes, from excessive heat, in particular against hydrocarbon fire and jet fire.

BACKGROUND OF THE INVENTION

Passive fire protection is used to protect objects against fire and are intended to contain fire and/or retard spreading of the fire. In general, such objects include electric cables, pipes and tanks conducting or containing hydrocarbons or other flammable materials, ventilation ducts, safety deposit boxes, penetration seals for cables and pipes in walls etc.

Heat sources include hydrocarbon fire, jet fire, hot gases, infrared radiated heat etc. Passive fire protection may use structural components such as fire-resistant walls, floors, and doors, or be in the form of e.g. an insulating layer of mineral fibres which will delay the heat from the fire in reaching the protected object on the "cold" side of the insulating layer. Other known technologies use intumescent materials which upon heating will expand and increase in volume. Still other technologies use materials which upon heating will go through one or more phases in which the material will react chemically and/or physically with one or more endothermic reactions, e.g. where hydrates are spent and water vapour is released, which has a cooling effect. Materials with such endothermic properties include polymer-based materials and rubber-based materials which are applied to the surface of the object to be protected.

SUMMARY OF THE INVENTION

In a first aspect, the invention provides a fire protection product for use as fire protection of a tubular object, such as a pipe, the fire protection product comprising an active layer of a material containing an active substance which, when subjected to heat, expands and undergoes an endothermic reaction process, the active layer encloses the pipe on at least a length of the pipe to be protected, a plurality of distance pieces extending a distance outwardly from the active layer, and an outer tubular cladding supported by the distance pieces and enclosing the pipe, the active layer and the distance pieces, wherein the active layer, the distance pieces and the outer tubular cladding define a space with a volume, which can accommodate the active substance after the active substance has expanded, wherein the space defines a draining path for draining of water, and wherein the plurality of distance pieces extend circumferentially around the active layer and have gaps aligned in an axial direction of the pipe so as to define the draining path.

By "active substance" is meant the part of the active layer which expands and undergoes an endothermic reaction process. The active layer may comprise further components or substances. As explained below, the active layer may undergo more than one endothermic process.

The outer tubular cladding is preferably mechanically supported by the distance pieces.

By having such a draining path build into the product, it can be obtained that any possible water generated either from condensation, or water ingress, inside the outer tubular cladding can be automatically drained out of the system. Such water may e.g. arise due to condensation of moisture due to temperature differences between a fluid flowing inside the pipe, or water ingress via breach of the joints in the outer tubular cladding as a consequence of the surroundings.

In a presently preferred embodiment of the invention, a longitudinally extending part of the draining path comprising the gaps extends along a substantial part of a downwardly facing side of the length of the pipe to be protected, when the fire protection product is in use. Hereby water collected in the draining path can flow towards discrete points from which it can be removed, if necessary.

The longitudinally extending part of the draining path comprising the gaps may be straight, such as having a substantially constant cross-section along a direction parallel to the axial direction of the pipe. The draining path is preferably empty across the whole cross-section. By "empty" is meant that substantially no solid or liquid material is located therein except for possible water to be drained away.

In some embodiments of the invention, one or more draining holes are provided in the outer tubular cladding for draining of water from the draining path through the one or more draining holes. By having such draining holes provided, the water collected in the draining path can be automatically removed. Each draining hole may be closed with a removable plug, or self-locking drain plug. A purpose of having the draining holes closed by plugs is to prevent water and dirt from the surroundings from entering into the fire protection product and possibly cause damage or degradation thereof. In addition, if self-locking drain plugs are utilized in the invention, the invention will be self-draining during operation, but the self-locking draining plugs will seal off via an intumescent material in a fire, consequently, maintaining the integrity of the passive fire protection.

The active layer may be water impermeable. Hereby it can be used to protect the pipe from water ingress from the surroundings which may result in built-in corrosion protection. The use of the distance pieces in the current invention is to have them acting as a sealer in the joints resulting from the active layer, consequently, making the overall invention water tight, when pressure from the outer metal cladding is applied. The active layer should also be recognized by having a very high thermal conductivity, resulting in the active layer having almost the same temperature as that of the fluid flowing inside the pipe. The consequence of this property is that condensated water resulting in temperature differences will be generated on the outside of the active layer. The condensated water will, again, be drained out via the drain plugs discussed earlier.

The active substance may be halogen free and free of isocyanates, and should generate a minimum amount of smoke, resulting in clear line of sight for humans exiting the installation in case of a fire.

The active substance may be fibre free resulting in a dust-free environment during installation and after installation has taken place. The advantage of a fibre free active substance is that the active fire protection properties are equally distributed around the tubular object protected. This does not exclude that the active layer may contain fibres as long as they do not form part of the active substance as fibre based materials has proven to sag during installation when installed in an environment that vibrates such as pipes carrying e.g. hydrocarbons.

In presently preferred embodiments of the invention, the active substance releases no corrosive gases or smoke production when heated. Preferably, this is also the case for any other components or substances comprised by the active layer. This will be particularly important when the fire protection product is used for pipes made from a material which could corrode, but it will also be important in relation to corrosion protection of surrounding equipment or components, including the outer cladding.

In some embodiments of the invention, the active substance will, at a first elevated temperature, swell and completely fill the void spaces generated by the distance pieces and, secondly, undergo a first endothermic process during which "trapped" water is released, and possibly evaporated, resulting in a cooling effect towards the object protected. As this reaction is extremely energy demanding, the heat from the fire will be consumed by the endothermic process and thereby delay the increase in temperature of the object protected.

In some embodiments of the invention, the active substance will, at a second elevated temperature higher than the first elevated temperature, undergo a second endothermic process during which a physically and thermally stable substance is created to form a fire barrier. The resulting thermally stable substance should be recognized by having a very low thermal conductivity, and as a result, will delay the heat penetration considerably in time, and yield further protection against damage of the pipe, which might otherwise have resulted in breakage and leak of the fluid flowing in the pipe.

The active substance may be a thermoplastic compound containing inorganic fillers in a binder composed of a co-polymer, such as an ethylene co-polymer. Such a technology has proven to be robust to weathering conditions over time and fluctuations in temperature, yielding a flexible layer that will move in parallel to the contraction/expansion of the pipe over time. In addition, a thermoplastic compound will yield ongoing protection and will not crack over time, consequently, yielding ongoing protection against water penetration via the joints in the active layer towards the tubular object protected. A thermoplastic compound has also the added benefits of being able to withstand extreme colds below minus 40 to minus 196 degrees Celsius without the loss of fire properties. This will yield that the invention is resistant to cold spills caused by leakage of e.g. liquefied natural gas.

In a second aspect, the invention provides for a pipe including a fire protection product in any of the embodiments as described above. Such a pipe may further include a layer of thermal insulation material installed on the outer tubular cladding. Such a layer of thermal insulation material may protect the surroundings from the temperature of the fluid flowing in the pipe. It may also protect the fluid flowing in the pipe from the temperature of the surroundings. Which kind of insulation is needed, will depend on the actual application for which the pipe is used.

The first and second aspects of the present invention may each be combined. These and other aspects of the invention will be apparent from and elucidated with reference to the embodiments described hereinafter.

The material which will expand and undergo an endothermic reaction process when exposed to heat can be either rubber-based or polymer-based. A preferred example of a polymer-based product is the product FAVUSEAL® NKX-6174 available from Favuseal AS, Norway. FAVUSEAL® NKX-6174 is a thermoplastic material containing inorganic fillers in a binder composed of an ethylene copolymer. It can be supplied as a wrap-around tape or sheets for use as a protective cover, or in granular form for extrusion. The FAVUSEAL® NKX-6174 also has the necessary resistance against penetration of water.

During exposure to flame or heat, FAVUSEAL® NKX-6174 goes through the following stages of transformation:
  90° C. Softening
  200° C. Evolution of water, swelling
  300° C. Pyrolysis of the polymeric binders
  800° C. Formation of rigid cellular ceramics stable up to 1500° C.

Properties of FAVUSEAL® NKX-6174 include:
  Good thermal conductivity in its virgin state
  Good thermal insulation above 200° C.
  Swells to approx. twice its original volume when exposed to heat
  Good mechanical stability in all states
  Acts as a flame barrier
  Halogen free, no isocyanates, no boric acid, no dangerous fibers
  No corrosive gases produced when reacting
  Very low smoke emission Applications of FAVUSEAL® NKX-6174 include:
  Fire barrier for protecting objects such as piping (steel/GRE), structures and walls, cables, cable trays and accessories.

| Physical properties of FAVUSEAL ® NKX-6174 | | |
|---|---|---|
| Property | Result/value | Procedure |
| Colour | Greyish-black | |
| Specific gravity | 1.776 | D-792 |
| Tensile strength | 3.2 MPa @ 23° C. | D-638 |
| Elongation at break | 320% @ 23° C. | D-638 |
| Melt flow | 2.1 g/10 min | D-1238D |
| Fire properties | | |
| Flaming mode | 407 | Dmax |
| Smoldering mode | 335 | Dmax |
| Smoke density | 94% (open flame) | ASTM E662 |
| Toxicity index | 1.6 (scale from 1-30) | DEF-STAN 713 |

| Thermal conductivity | |
|---|---|
| From of the FAVUSEAL ® NKX-6174 | W/m · K – λ |
| Virgin state, Non-ceramic form | 0.69 |
| Ceramic form | 0.07 |

When FAVUSEAL® NKX-6174 is subjected to heat, for example in a fire, two phase transitions take place. The first phase takes place between 200 and 250° C. and the second phase takes place between 700 and 800° C. At the first phase transition, crystal water is generated from the O-H groups in the fillers. The water evaporates and the reaction is strongly endothermic (heat absorbing). The temperature behind the barrier of FAVUSEAL® NKX-6174 will not exceed approx. 300° C. as long as this reaction takes place because this process actually consumes energy which is used to release the water. The second phase is at 700-800° C. creating a solid microporous ceramic substance with very low thermal conductivity which also is physically stable.

BRIEF DESCRIPTION OF THE DRAWINGS

The fire protection product according to the invention will now be described in more detail with regard to the accompanying figures. The figures show one way of implementing the present invention and is not to be construed as being limiting to other possible embodiments falling within the scope of the attached claim set.

DETAILED DESCRIPTION OF THE DRAWINGS

Figure 1:
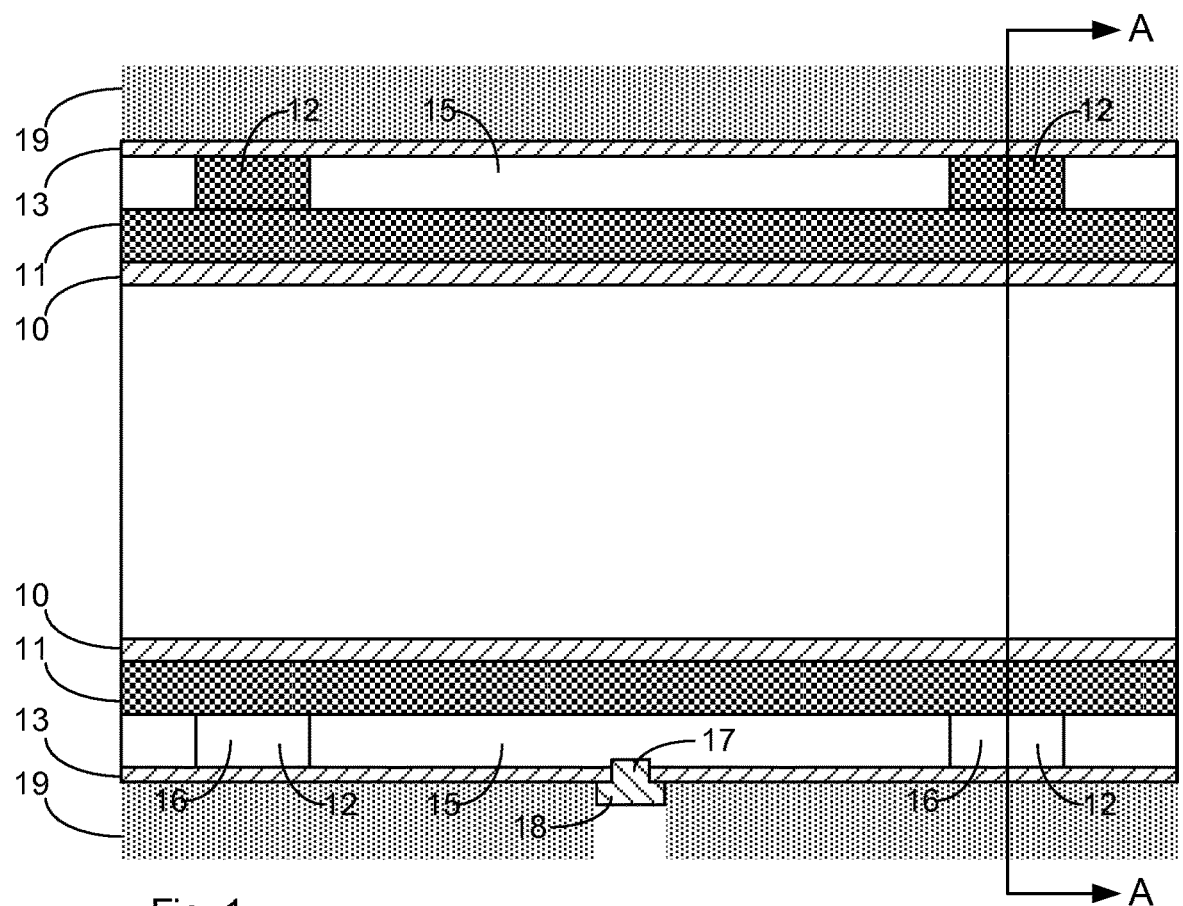
FIG. 1 is a longitudinal section through a section of a pipe with a fire protection product according to the invention.

In FIG. 1 is shown a section of a pipe 10, e.g. a steel pipe used for conducting hydrocarbons. On the outer surface of the pipe 10 is an active layer 11 of a material containing an active substance which, when subjected to heat, expands and undergoes an endothermic reaction process. The active layer preferably contains a polymer-based or rubber-based material and encloses the pipe on at least a length of the pipe to be protected against fire. A preferred material is the above-identified FAVUSEAL® NKX-6174. A plurality of distance pieces 12, preferably of the same material as the active layer 11, are arranged on the outer side of the active layer 11 and extend a distance outwardly from the active layer. The distance pieces should preferably be made of the same material as the active layer in order for the void space created by the distance pieces to be 100% sealed via the swelling effect recognized by the first endothermic reaction process. Such distance pieces made preferably of the same material as the active layer will not cause any adverse effects by combining different technologies, as they are compatible. The distance pieces 12 support an outer tubular cladding 13, e.g. of metal such as steel, and the active layer, the distance pieces and the outer tubular cladding define a space 15 with a volume.

When subjected to heat such as a hydrocarbon fire or a jet fire, the active layer 11 will first expand into the space. The preferred material, FAVUSEAL® NKX-6174, will expand to approximately two times its original volume, and the volume of the space is dimensioned to accommodate the active substance after the active substance has expanded, so that the active substance can expand fully and fill the space 15. In the expanded state, the FAVUSEAL® NKX-6174 has a thermal conductivity of about 10% of the thermal conductivity in the non-expanded state and therefore acts as an insulating layer later in a fire scenario.

Figure 2:
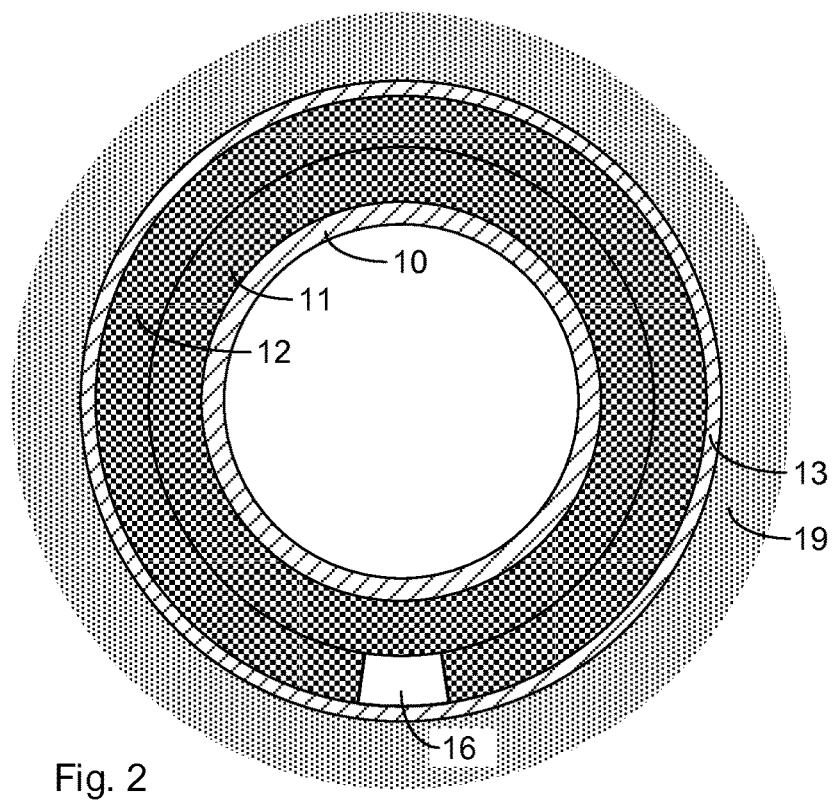
FIG. 2 is a cross section through the pipe in FIG. 1 taken as indicated by the arrows A-A.

Humidity in the space 15 may arise from water ingress via leakage in the joints of the tubular metal cladding, or as a result of condensated water resulting in temperature differences between the fluid flowing inside of the pipe and the ambient temperature, and will form liquid water. The space 15 in itself defines a draining path for draining of water out of the product. As best seen in FIG. 2, each of the plurality of distance pieces 12 extends circumferentially around the active layer 11 and have gaps 16 aligned in the axial direction of the pipe so as to define the draining path extending in the longitudinal direction of the pipe 10. As seen in FIG. 1, a longitudinally extending part of the draining path 15,16 comprising the gaps 16 extends along a substantial length of a downwardly facing side of the length of the pipe 10 to be protected, when the fire protection product is in use. This longitudinally extending part of the draining path 15,16 comprising the gaps 16 may be straight.

The outer cladding 13 preferably has one or more draining holes 17 for draining of water from the draining path through the draining holes 17. Each draining hole 17 is closed with a removable plug 18. Preferably, the plugs 18 are self-locking drain plugs that, in case of fire, will seal off the opening via an intumescent material inside the drain plug, such as a graphite-based high intumescent material, or any other expanding material fit for the purpose in order to seal off the drain plugs, consequently, maintaining the integrity of the invention when exposed to a fire.

The above-described structure with the active layer 11, the distance pieces 12 and the outer tubular cladding 13 constitute a fire protection of the pipe 10.

If desired, a layer of thermal insulating material 19, not necessarily with any fire resistance at all, can be applied to the outer surface of the outer tubular cladding in order to yield both thermal and fire protection 13. Suitable thermal insulating materials include mineral wool products such as ISOVER ULTIMATE from SAINT-GOBAIN ISOVER and similar products yielding thermal insulation.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. In addition, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A fire protection product configured to protect a pipe, the fire protection product comprising:
   an active layer of a material comprising an active substance which, when subjected to heat, expands and undergoes an endothermic reaction process, the active layer enclosing the pipe on at least a length of the pipe to be protected,
   a plurality of distance pieces extending a distance outwardly from the active layer, and
   an outer tubular cladding supported by the distance pieces and enclosing the pipe, the active layer and the distance pieces,
   wherein
   the active layer, the distance pieces and the outer tubular cladding define a space with a volume, which can accommodate the active substance after the active substance has expanded, wherein
 the space defines a draining path for draining of water,
wherein
 the plurality of distance pieces extend circumferentially around the active layer and have gaps aligned in an axial direction of the pipe so as to define the draining path, and
wherein
 a longitudinally extending part of the draining path comprising the gaps extends along at least a part of a downwardly facing side of the length of the pipe to be protected, when the fire protection product is in use.

2. The fire protection product according to claim 1, wherein the longitudinally extending part of the draining path comprising the gaps is straight.

3. The fire protection product according to claim 1, wherein one or more draining holes are provided in the outer tubular cladding and said one or more draining holes are configured to drain water from the draining path through the one or more draining holes.

4. The fire protection product according to claim 3, wherein each draining hole of the one or more draining holes is closed with a removable plug.

5. The fire protection product according to claim 1, wherein the active layer is water impermeable.

6. The fire protection product according to claim 1, wherein the active substance is halogen free.

7. The fire protection product according to claim 1, wherein the active substance is fibre free.

8. The fire protection product according to claim 1, wherein the active substance releases no corrosive gases or significant smoke production when heated.

9. The fire protection product according to claim 1, wherein the active substance will, at a first elevated temperature, swell and fill the void spaces generated by the distance pieces and, secondly, undergo a first endothermic process during, whereby water is released and evaporated.

10. The fire protection product according to claim 9, wherein the active substance will, at a second elevated temperature higher than the first elevated temperature, undergo a second endothermic process during which a physically and thermally stable fire barrier is created.

11. The fire protection product according to claim 1, wherein the active substance is a thermoplastic compound containing inorganic fillers in a binder composed of a copolymer.

12. A pipe comprising the fire protection product according to claim 1.

13. The pipe according to claim 12, further comprising a layer of thermal insulation material on the outer tubular cladding.

14. The fire protection product according to claim 1, wherein the active substance is a thermoplastic compound containing inorganic fillers in a binder composed of an ethylene copolymer.

* * * * *